(12) United States Patent
Lee

(10) Patent No.: US 12,489,116 B2
(45) Date of Patent: Dec. 2, 2025

(54) ANODE ACTIVE MATERIAL, MANUFACTURING METHOD THEREOF, ANODE AND SECONDARY BATTERY INCLUDING THE SAME

(71) Applicant: Industry-Academic Cooperation Foundation, Dankook University, Gyeonggi-do (KR)

(72) Inventor: Byoungsun Lee, Gyeonggi-do (KR)

(73) Assignee: Industry-Academic Cooperation Foundation, Dankook University, Yongin-si (KR)

( * ) Notice: Subject to any disclaimer, the term of this patent is extended or adjusted under 35 U.S.C. 154(b) by 623 days.

(21) Appl. No.: 17/856,232

(22) Filed: Jul. 1, 2022

(65) Prior Publication Data

US 2023/0006205 A1    Jan. 5, 2023

(30) Foreign Application Priority Data

Jul. 2, 2021   (KR) .................. 10-2021-0087248

(51) Int. Cl.
| | |
|---|---|
| *H01M 4/587* | (2010.01) |
| *C01B 32/05* | (2017.01) |
| *C01B 32/205* | (2017.01) |
| *C01B 32/21* | (2017.01) |
| *H01M 4/02* | (2006.01) |

(52) U.S. Cl.
CPC ............ *H01M 4/587* (2013.01); *C01B 32/05* (2017.08); *C01B 32/205* (2017.08); *C01B 32/21* (2017.08); *C01P 2004/03* (2013.01); *C01P 2004/32* (2013.01); *C01P 2004/50* (2013.01); *C01P 2004/52* (2013.01); *C01P 2004/61* (2013.01); *C01P 2004/62* (2013.01); *C01P 2004/64* (2013.01); *C01P 2006/12* (2013.01); *C01P 2006/40* (2013.01); *H01M 2004/021* (2013.01); *H01M 2004/027* (2013.01)

(58) Field of Classification Search
CPC .......... H01M 4/587; H01M 2004/021; H01M 2004/027; H01M 4/133; H01M 4/1393; H01M 4/36; H01M 4/364; H01M 4/625; H01M 10/052; H01M 10/0525; H01M 10/054; C01B 32/05; C01B 32/205; C01B 32/21; C01P 2004/03; C01P 2004/32; C01P 2004/50; C01P 2004/52; C01P 2004/61; C01P 2004/62; C01P 2004/64; C01P 2006/12; C01P 2006/40; C01P 2004/51; C01P 2004/60; Y02E 60/10
See application file for complete search history.

(56) References Cited

U.S. PATENT DOCUMENTS

2006/0024580 A1* 2/2006 Nakayama ............ H01M 4/364
429/218.2

FOREIGN PATENT DOCUMENTS

| KR | 2008-0053229 A | 6/2008 |
| KR | 2018-0092345 A | 8/2018 |
| KR | 20180133749 A | * 12/2018 |

* cited by examiner

*Primary Examiner* — Daniel S Gatewood
(74) *Attorney, Agent, or Firm* — Sughrue Mion, PLLC

(57) ABSTRACT

The present invention relates to an anode active material, a method of manufacturing the anode active material, and an anode and a secondary battery including the anode active material, the anode active material including secondary carbon particles formed by flocculation of a plurality of primary carbon particles having an average particle diameter ($D_{50}$) in a range from 5 to 200 nm, wherein the secondary carbon particles have an average particle diameter ($D_{50}$) in a range from 0.5 to 20 μm.

17 Claims, 5 Drawing Sheets

ANODE ACTIVE MATERIAL, MANUFACTURING METHOD THEREOF, ANODE AND SECONDARY BATTERY INCLUDING THE SAME

CROSS-REFERENCE TO RELATED APPLICATION

This application claims priority under 35 U.S.C. § 119 to Korean Patent Application No. 10-2021-0087248, filed on Jul. 2, 2021, in the Korean Intellectual Property Office (KIPO), the disclosure of which is incorporated by reference herein in its entirety.

TECHNICAL FIELD

The present invention relates to an anode active material, a method of manufacturing the anode active material, and an anode and a secondary battery including the anode active material, and specifically, to an anode active material capable of improving characteristics of secondary batteries such as capacity, lifespan and rate controlling, a method of manufacturing the anode active material, and an anode and a secondary battery including the anode active material.

BACKGROUND ART

Graphite is a major anode (e.g., negative electrode) active material for commercial lithium secondary batteries. Due to its layered structure, reversible electrochemical lithium insertion/deintercalation is possible, and a high energy density may be achieved when forming a battery with a cathode (e.g., positive electrode) by virtue of its low reduction potential. In this graphite anode material, lithium may only enter and exit through an edge plane of the layered structure. However, since graphite is manufactured through a spheroidization process, exposure of the edge plane to an electrolyte is small, so a passage of lithium for entering and exiting is limited. Accordingly, lithium insertion into the graphite active material may stagnate during rapid charging, and dendrites were thus formed. This not only degrades rate controlling and lifespan performance of the secondary battery, but also causes a short circuit with the cathode, which may cause a fire.

In addition, since graphite has a narrow interplanar distance ($d_{002}$=0.335 nm) of a base surface, structural deformation occurs when lithium is inserted, thereby slowing an initial reaction rate in the lithium secondary battery. In addition, cations such as $Na^+$, $K^+$, $Mg^{2+}$, and $Al^{3+}$ used in next-generation secondary batteries are not easy to enter and exit from graphite because of their large diameters, and accordingly, when graphite is used as an anode active material for next-generation secondary batteries, there was a problem in that the capacity, lifespan, and rate of the secondary battery are degraded.

SUMMARY

Aspects of embodiments of the present invention are directed to an anode active material applicable to a secondary battery to improve characteristics of the secondary battery such as capacity, lifespan and rate controlling.

According to an embodiment, an anode active material includes secondary carbon particles formed by flocculation of a plurality of primary carbon particles having an average particle diameter ($D_{50}$) in a range from 5 to 200 nm, wherein the secondary carbon particles have an average particle diameter ($D_{50}$) in a range from 0.5 to 20 μm.

According to an embodiment, an anode includes the anode active material.

According to an embodiment, a secondary battery includes the anode.

According to an embodiment, a method of manufacturing an anode active material includes: (S100) forming a first solution by dissolving a carbonization precursor polymer and a sacrificial polymer in a first solvent which is a common solvent; (S200) forming a first aggregate by removing the first solvent from the first solution; and (S300) carbonizing the first aggregate, or carbonizing a second aggregate formed by removing the sacrificial polymer from the first aggregate.

According to an embodiment, secondary carbon particles are formed by flocculation of a plurality of primary carbon particles having an average particle diameter ($D_{50}$) in a range from 5 to 200 nm, wherein the secondary carbon particles have an average particle diameter ($D_{50}$) in a range from 0.5 to 20 μm and have a spherical porous structure.

According to one or more embodiments of the present invention, the anode active material of the present invention may form a wide interface with an electrolyte, and accordingly, characteristics of the battery such as capacity, lifespan, and rate controlling may be improved because cations may easily enter and exit, and an ion storage capacity is excellent.

BRIEF DESCRIPTION OF THE DRAWINGS

A more complete appreciation of the present invention will become more apparent by describing in detail embodiments thereof with reference to the accompanying drawings, wherein.

DETAILED DESCRIPTION

Figure 1:
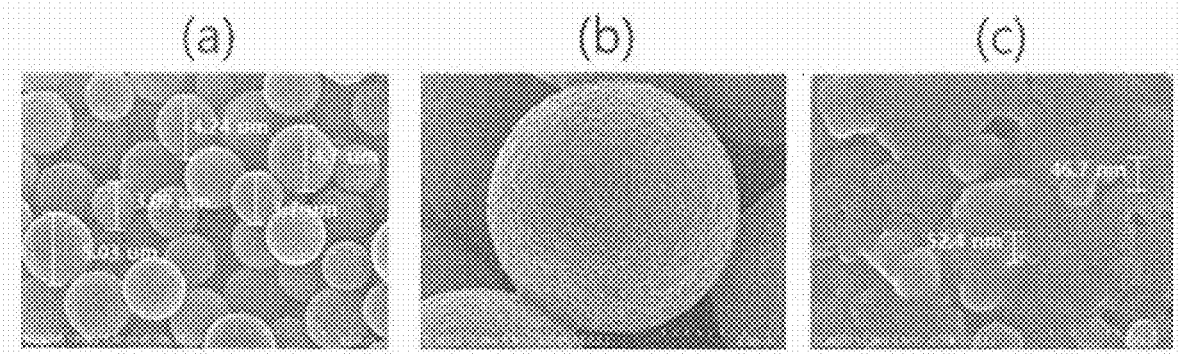
FIG. 1 is a SEM (Scanning Electron Microscope) image illustrating secondary Polyacrylonitrile (PAN) particles prepared in Embodiment 1-1.

Hereinafter, the present invention will be described.
<Anode Active Material and Manufacturing Method Thereof>

An anode active material according to the present invention includes secondary carbon particles formed by flocculation of a plurality of primary carbon particles.

In such an embodiment, an average particle diameter ($D_{50}$) of the primary carbon particles may be in a range from about 5 to 200 nm, specifically, in a range from about 5 to 100 nm. As the plurality of primary carbon particles are flocculated and aggregated, the secondary carbon particles of the present invention may have an average particle diameter ($D_{50}$) in a range from about 0.5 to 20 μm, specifically in a range from about 1 to 10 μm, and more specifically in a range from about 1 to 5 μm. The anode active material of the present invention including the secondary carbon particles having such a particle size range may form a wide interface with an electrolyte, thereby allowing easy entry and exit of lithium ions ($Li^+$) as well as cations such as $Na^+$, $K^+$, $Mg^{2+}$, $Al^{3+}$ and the like used in next-generation secondary batteries. In addition, in the anode active material of the present invention, the secondary carbon particles may improve an electrode density, and when the secondary carbon particles are mixed with graphite, a low operating voltage of graphite may be compensated to improve a charge/discharge rate, and it is possible to further improve an energy density of the secondary battery.

In addition, in the anode active material of the present invention, the secondary carbon particles have a spherical porous structure. The secondary carbon particles having such a spherical porous structure may have a BET specific surface area in a range from 0.5 to 100 $m^2/g$.

In addition, in the anode active material of the present invention, the secondary carbon particles have a uniform particle size distribution and thus have monodispersity. In an example, the particle size distribution of the secondary carbon particles may satisfy Relational Expression 1 below.

$$0.4 \leq (D_{90}-D_{10})/D_{50} \leq 0.7 \qquad (1)$$

(In the above Relational Expression, $D_{90}$, $D_{10}$ and $D_{50}$ are particle sizes having a cumulative volume of 90% by volume, a particle size having a cumulative volume of 10% by volume, and a particle size having a cumulative volume of 50% by volume, respectively, in a volume-based particle size distribution by a laser diffraction particle size distribution measuring method.)

In addition, in the secondary carbon particles, fine particles containing one or more metal M of a group 13 element, a group 14 element, and a transition metal may be further added. In such a case, a lithium ion storage capacity of the anode active material of the present invention may be further improved.

Specifically, examples of the metal M may include tin (Sn), aluminum (Al), silicon (Si), copper (Cu), iron (Fe), cobalt (Co), selenium (Se), nickel (Ni), zinc (Zn), cerium (Ce), cadmium (Cd), and the like, but the present invention is not limited thereto. In addition, any electrochemically active metal in the art may be used without limitation.

In an example, one or more metal fine particles of tin (Sn), aluminum (Al), silicon (Si), and copper (Cu) may be further included. In such a case, the lithium ion storage capacity of the anode active material of the present invention may be further improved.

The anode active material may further include graphite in addition to the secondary carbon particles described above. An average particle diameter of the graphite is not particularly limited, but may be in a range from about 10 to 20 and specifically in a range from about 13 to 18 in consideration of the average particle diameter and porosity of the secondary carbon particles.

In an example, a ratio D2/D1 of a particle diameter D2 of the graphite to a particle diameter D1 of the secondary carbon particles may be in a range from 2 to 8. In such a case, a ratio (mixing ratio) of the secondary carbon particles and graphite used is not particularly limited, and may be, for example, in a range from 5:95 to 90:10 by weight. In such a case, an energy density and charge/discharge efficiency of the secondary battery may be improved.

As described above, the anode active material of the present invention has a spherical porous structure in which secondary carbon particles are formed of primary carbon particles having an average particle diameter of 200 nm or less, have an average particle diameter of about 20 μm or less, have a uniform particle size distribution, and are structurally stable. Accordingly, the anode active material of the present invention may form a wide interface with the electrolyte, thus allowing cations to enter and exit easily, and have excellent ion storage capacity to improve characteristics of the battery such as capacity, lifespan, rate controlling and the like. The anode active material of the present invention may be used in any device that undergoes an electrochemical reaction. For example, there are all kinds of primary batteries, secondary batteries, fuel cells, solar cells, capacitors, and the like, among which the secondary battery is preferable.

The anode active material of the present invention described above may be prepared by forming secondary carbon particles through a self-flocculation process that occurs between heterogeneous polymer solutions.

A method of preparing an anode active material according to an example of the present invention includes: forming a first solution by dissolving a carbonization precursor polymer and a sacrificial polymer in a first solvent which is a common solvent (S100); forming a first aggregate by removing the first solvent from the first solution (S200); and carbonizing the first aggregate or carbonizing a second aggregate formed by removing the sacrificial polymer from the first aggregate (S300). However, the present invention is not limited only by the above manufacturing method, and steps of each process may be modified or selectively mixed as needed.

Hereinafter, with respect to the process of preparing the anode active material according to the present invention, each process will be described by steps.

Step S100: Forming of the First Solution

First, the first solution is formed by dissolving the carbonization precursor polymer, the sacrificial polymer, and, if necessary, a tin precursor in the first solvent which is a common solvent.

Step S100 may be performed by mixing the carbonization precursor polymer and the sacrificial polymer with each other and then adding the mixture to the first solvent, or by adding one of the carbonization precursor polymer and the sacrificial polymer to the first solvent and then adding the rest of them thereto. When the carbonization precursor polymer and the sacrificial polymer are mixed, they do not chemically react with each other.

In the present invention, the carbonization precursor polymer is a polymer that may be converted into a carbon material through heat treatment, and is self-flocculated in solution phase to form micelle-shaped primary particles of the carbonization precursor polymer (hereinafter, "primary polymer particles"), and these primary polymer particles are aggregated together with the sacrificial polymer upon removal of the first solvent to form a bullion (e.g., mass) of the first aggregate.

Non-limiting examples of the carbonization precursor polymer may include polyacrylonitrile (PAN), polyvinyl pyrrolidine (PVP), polyimide, polyvinyl alcohol (PVA), polyvinyl chloride (PVC), pitch, lignin, cellulose, and the like, which may be used alone or in combination of two or more types thereof. In an example, the carbonization precursor polymer may be polyacrylonitrile (PAN).

The sacrificial polymer is an immiscible polymer that does not chemically react with the carbonization precursor polymer and undergoes phase separation when blended with the carbonization precursor polymer. The sacrificial polymer may be easily removed by organic solvents while assisting the carbonization precursor polymer to form micelles as a matrix in solution phase.

In an example, when the carbonization precursor polymer includes at least one repeating unit, the sacrificial polymer may be a copolymer including the repeating unit. For example, the sacrificial polymer may include styrene-co-acrylonitrile (SAN), polylactic acid (PLA), poly(lactic-co-glycolic acid) (PLGA), polymethacrylate (PMMA), poly(vinylidene fluoride) (PVDF), but the present invention is not limited thereto. In an example, the sacrificial polymer may be styrene-co-acrylonitrile (SAN).

A ratio (mixing ratio) of the above-described carbonization precursor polymer and the sacrificial polymer used is not particularly limited, and may be, for example, in a range from 1:2 to 9 by weight. If the ratio of the carbonization precursor polymer and the sacrificial polymer used is within the above range, secondary carbon particles having a uniform particle size distribution and an average particle diameter of 20 μm or less may be obtained without lowering a yield later. In an example, the ratio (mixing ratio) of the carbonization precursor polymer and the sacrificial polymer used may be in a range from 1:3 to 5 by weight. In such a case, secondary carbon particles having an average particle diameter in a range from about 2 to 6 μm may be easily prepared.

For example, the mixing ratio of the carbonization precursor polymer and the sacrificial polymer may be in a range from 1:2 to 9 by weight (e.g., 1:4 by weight). In such a case, spherical porous secondary carbon particles having a particle diameter in a range from about 0.5 to 20 μm may be prepared with a high yield.

The first solvent is a common solvent of the carbonization precursor polymer and the sacrificial polymer, and is not particularly limited as long as it may dissolve both of them.

Examples of the first solvent may include dimethylformamide, diethyl ether, ethanol, methanol, n-propanol, iso-propyl alcohol, acetone, n-pentane, ethylene dichloride, methyl acetate, ethyl acetate, acetonitrile, tetrahydrofuran (THF), n-hexane, chlorohexane, chloropentane, carbon tetrachloride, 1,2-dichloroethane, 1,2-dichloroethylene, trichloroethylene, methyl ethyl ketone, or 1,2-dimethoxy ethane (DME), but the present invention is not limited thereto.

A content of the first solvent is not particularly limited as long as it may sufficiently dissolve both the carbonization precursor polymer and the sacrificial polymer.

A method of mixing the carbonization precursor and the sacrificial polymer described above is not particularly limited, and may be mixed using, for example, a stirrer, a high-speed revolving/rotating mixer, or ball milling equipment.

Optionally, the present invention may further include a metal precursor including at least one metal M selected from a group 13 element, a group 14 element and a transition metal in the first solvent, in addition to the above-described carbonization precursor polymer and sacrificial polymer in the first solvent. Specifically, examples of the metal M may include tin (Sn), aluminum (Al), silicon (Si), copper (Cu), iron (Fe), cobalt (Co), selenium (Se), nickel (Ni), zinc (Zn), cerium (Ce), cadmium (Cd), and the like, but the present invention is not limited thereto. In addition, any metal precursor containing an electrochemically active metal in the art may be used without limitation. When the metal precursor is carbonized, the metal component remains and the remaining part is removed, such that pores may be additionally formed in the secondary carbon particles. In addition, the remaining metal component may be included in the secondary carbon particles as metal fine particles to improve a storage capacity of lithium ions.

In an example, one or more metal precursors selected from a tin precursor, an aluminum precursor, a silicon precursor, and a copper precursor may be additionally added to the first solvent.

Examples of the tin precursor may include tin acetate, tin chloride ($SnCl_2$), and tin sulfate ($SnSO_4$), and examples of the aluminum precursor may include aluminum chloride, aluminum bromide, aluminum sulfate, aluminum nitrate, aluminum acetate, and the like, examples of the silicon precursor may include silane ($SiH_4$), dichlorosilane ($SiH_2Cl_2$), monochlorosilane ($SiH_3Cl$), tetrachlorosilane ($SiCl_4$), hexachlorodisilane ($Si_2Cl_6$), tetraethyl orthosilicate (TEOS), and the like, and examples of the copper precursor may include copper chloride ($CuCl_2$), copper nitrate [$Cu(NO_3)_2$], copper sulfate ($CuSO_4$), copper acetate [$(CH_3COO)_2Cu$], copper acetylacetate [$Cu(acac)_2$], and the like, but the present invention is not limited thereto.

A content of the metal precursor is not particularly limited, and in an example, it is added so that an element ratio of C:M is in a range from 10 to 1:1 (specifically, in a range from 8 to 3:1) with respect to carbon (C) of the carbonization precursor polymer. If the content of the metal precursor is within the above-described range, the lithium ion storage capacity may be improved without degradation of lifespan characteristics. In an example, a content of the tin precursor may be added so that an element ratio of C:M is in a range from 8 to 3:1 with respect to carbon (C) of the carbonization precursor polymer.

Step S200: Forming of the First Aggregate

The first aggregate is formed by removing the first solvent from the first solution obtained in step S100.

In an example, when the first solution is dried, the first solvent in the first solution is evaporated and removed, thereby obtaining the first aggregate.

The first aggregate is a bullion of particles, and includes the primary particles of the carbonization precursor polymer and the sacrificial polymer. Specifically, in the first aggregate, the plurality of primary particles of the carbonization precursor polymer are flocculated and aggregated, and the sacrificial polymer exists between the primary polymer particles.

Step S300: Carbonizing of the First Aggregate or the Second Aggregate

The first aggregate obtained in step S200 or the second aggregate obtained by removing the sacrificial polymer from the first aggregate is carbonized.

In step S300, by removing the sacrificial polymer and converting the carbonization precursor polymer particles into carbon particles, an anode active material including secondary carbon particles formed by flocculating and aggregating of the primary carbon particles may be prepared.

Specifically, in step S300, the first aggregate or the second aggregate may be carbonized by heat treatment for about 1.5 to 2.5 hours (specifically, about 1.8 to 2.2 hours) after raising a temperature to a range from about 600 to 1600° C. (specifically, about 800 to 1200° C.) at a temperature increase rate in a range from about 3 to 7° C./min in an inert gas atmosphere. In particular, when the first aggregate is carbonized, the carbonization precursor polymer particles in the first aggregate are converted into carbon particles, and at the same time, the sacrificial polymer in the first aggregate is thermally decomposed and removed, such that the primary carbon particles are flocculated and aggregated to form the secondary carbon particles. In such a case, the secondary carbon particles may have a spherical porous structure.

Prior to the above-described carbonization process, either the first aggregate or the second aggregate may be stabilized. Specifically, after raising the temperature to a range from about 200 to 300° C. (specifically, about 250 to 300° C.) at a temperature increase rate of about 5 to 15° C./min, the first aggregate or the second aggregate may be heat-treated in an oxygen-containing atmosphere for 0.5 to 1.5 hours (specifically, about 0.8 to 1.2 hours) to be stabilized, and then the stabilized first aggregate or second aggregate may be carbonized.

The second aggregate, which is a particle formed by removing the sacrificial polymer from the first aggregate obtained in step S200 and leaving only the carbonization precursor polymer therein, may be obtained by (a) forming a second solution containing the second aggregate by dissolving the sacrificial polymer in the first aggregate with a second solvent for dissolving the sacrificial polymer; and (b) separating the second aggregate from the second solution.

Step (a) is a step of removing the sacrificial polymer from the first aggregate obtained in step S200, and when the first aggregate is added to the second solvent, the sacrificial polymer in the first aggregate is dissolved by the second solvent and, accordingly, the sacrificial polymer is removed from the first aggregate. The second solution obtained through this dissolution process contains the second aggregate, which is a mass (e.g., bullion) of the second solvent, the sacrificial polymer component dissolved in the second solvent, and the primary particles of the carbonization precursor polymer aggregated together.

The second solvent applicable in the present invention is not particularly limited as long as it is a solvent capable of dissolving only the sacrificial polymer in the first aggregate.

A non-limiting example of the second solvent may be a solvent such as a ketone-based solvent (e.g., acetone).

A content of the second solvent is adjusted according to the content of the sacrificial polymer or the content of the first aggregate. In an example, a ratio (W2/W1) of the content (W2) of the second solvent to the content (W1) of the sacrificial polymer (W2/W1) may be in a range from about 18 to 22. In another example, a ratio (mixing ratio) of the first aggregate and the second solvent used may be in a range from 1:14 to 18 by weight.

Step (b) is a step of separating the second aggregate from the second solution, and may be performed through a solid-liquid separation process or a drying process of an organic solvent, but the present invention is not limited thereto.

The solid-liquid separation process may be performed by a solid-liquid separation means generally known in the art, for example, a filter press, a centrifugal separator, a centrifugal filter, a reduced pressure filter, and the like, but the present invention is not limited thereto. The solid-liquid separation process may be repeated multiple times, and for example, may be repeated about 1 to 5 times.

In an example, in step (b), the second aggregate may be obtained from the second solution using a centrifuge, separately from the second solvent. During centrifugation using such a centrifuge, the primary particles of the carbonization precursor polymer may be easily aggregated due to a centrifugal force, and accordingly, the second aggregate made of the secondary particles of the carbonization precursor polymer may be more easily obtained.

Optionally, after the solid-liquid separation process, the separated second aggregate may be dried to remove the second solvent remaining in the second aggregate.

In the drying process of the organic solvent, the second aggregate may be separated by drying the second solution to remove the second solvent. When the second solvent is removed, the sacrificial polymer component dissolved in the second solvent is also removed.

A drying temperature is not particularly limited, and it is appropriate to carry out the drying at a temperature below a carbonization temperature of the carbonization precursor polymer so that the carbonization precursor polymer is not carbonized. In an example, step (b) may be performed by drying the second solution at about 90 to 110° C. for 22 to 26 hours. However, the time and temperature of the drying process may be variously changed according to the manufacturing environment.

<Anode>

The present invention provides an anode (e.g., negative electrode) using the anode active material described above.

In an example, the anode of the present invention may include a current collector; and a layer of the anode active material described above on at least one surface of the current collector.

The current collector may include any metal that has high conductivity, is easily adhered to a slurry of the anode active material, and has no reactivity in a voltage range of the battery. For example, there are a mesh, foil, and the like made of aluminum (Al), copper (Cu), gold (Au), nickel (Ni), titanium (Ti), baked carbon, stainless steel, aluminum alloy (e.g., aluminum-cadmium alloy, and the like); or copper or stainless surface-treated with carbon, nickel, titanium, silver, and the like; or a combination thereof. A thickness of the current collector is not particularly limited, and may be in a range from about 3 to 500 μm that is commonly applied.

The anode active material layer may be formed by coating an anode slurry including the above-described anode active material, a binder, a solvent, and, if necessary, a conductive material, on at least one surface of the current collector, drying it, and then rolling.

Since the description of the anode active material is the same as described above, it will be omitted.

A content of the anode active material may be in a range from about 80 to 99% by weight with respect to the total amount of the anode slurry.

The binder attaches the anode active material to the current collector, while attaching the anode active material particles to each other, and is not particularly limited as long as it is generally used in the art. Examples thereof may include polyvinylidene fluoride-hexafluoropropylene copolymer (PVDF-co-HFP), polyvinylidenefluoride, polyacrylonitrile, polymethylmethacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, styrene butyrene rubber (SBR), lithium-substituted polyacrylate (Li-PAA), and the like, which may be used alone or in combination of two or more thereof.

A content of the binder is not particularly limited, and may be, for example, in a range from about 0.1 to 20% by weight with respect to the total amount of the anode slurry.

The conductive material is used to impart conductivity to the electrode, and is not particularly limited as long as it has conductivity without causing a chemical change in the battery. Examples thereof may include natural graphite, artificial graphite, carbon black, acetylene black, Ketjen black, carbon nanotubes, graphene, conductive fibers (such as carbon fibers or metal fibers), metal powders (such as fluorocarbons, copper, aluminum, nickel, silver powder, and the like), conductive whiskers (e.g., zinc oxide, potassium titanate, and the like), conductive metal oxides (e.g., titanium oxide, and the like), conductive polymers (e.g., polyphenylene derivatives, and the like), or mixtures thereof. A content of the conductive material may be in a range from about 0.1 to 20 wt % with respect to the total amount of the anode slurry composition.

Non-limiting examples of the solvent may include dimethyl sulfoxide (DMSO), N-methyl pyrrolidone (NMP), dimethyl formamide (DMF), and the like. A content of such a solvent is not particularly limited, and may be used in an amount that may achieve a desirable viscosity of the anode slurry.

A coating method of the anode slurry is not particularly limited as long as it is commonly used in the art. For example, there are a slot die coating method, a gravure coating method, a dip coating method, a spray coating method, and the like.

<Secondary Battery>

The present invention provides a secondary battery including the above-described anode.

The secondary battery of the present invention includes the above-described anode; a cathode (e.g., positive electrode), an electrolyte, and a separator. The secondary battery is any device that continuously performs an electrochemical reaction through charging and discharging, and may be, for example, a lithium (Li) secondary battery, a sodium (Na) secondary battery, and the like. In an example, the secondary battery of the present invention may be a lithium ion secondary battery or a sodium ion secondary battery.

The cathode may be manufactured by preparing a cathode slurry by mixing a cathode active material, a conductive material, a binder, and a solvent; and then by directly coating the cathode slurry on a metal current collector, or by casting the cathode slurry on a separate support to laminate a cathode active material film peeled from the support on the metal current collector.

The cathode active material applicable in the present invention is not particularly limited as long as it is a cathode active material used in secondary batteries (e.g., lithium ion secondary batteries, sodium ion secondary batteries, and the like) in the art. Non-limiting examples of the anode active material may include lithium-containing transition metal oxides such as $LiCoO_2$, $LiNiO_2$, $LiMnO_2$, $LiMn_2O_4$, $Li(Ni_aCo_bMn_c)O_2$ (0<a<1, 0<b<1, a+b+c=1), $LiNi_{1-Y}Co_YO_2$, $LiCo_{1-Y}Mn_YO_2$, $LiNi_{1-Y}Mn_YO_2$ (where 0≤Y<1), $Li(Ni_aCo_bMn_c)O_4$ (0<a<2, 0<b<2, a+b+c=2), $LiMn_{2-Z}NiZO_4$, $LiMn_{2-Z}Co_ZO_4$ (where 0<Z<2), $LiCoPO_4$, and $LiFePO_4$ and mixtures thereof; and sodium-containing transition metal oxides such as $Na_xCoO_2$ (where 0<x<1), $Na_xCo_{2/3}Mn_{1/3}O_2$ (where 0<x≤1), $Na_xFe_{1/2}Mn_{1/2}O_2$ (where 0<x≤1), $NaCrO_2$, $NaLi_{0.2}Ni_{0.25}Mn_{0.75}O_{2.35}$, $Na_{0.44}MnO_2$, $NaMnO_2$, $Na_{0.7}VO_2$, $Na_{0.33}V_2O_5$, $Na_3V_2(PO_4)_3$, $NaFePO_4$, $NaMn_{0.5}Fe_{0.5}PO_4$, $Na_3V_2(PO_4)_3$, $Na_2FePO_4F$, $Na_3V_2(PO_4)_3$, $NaFeSO_4F$ and mixtures thereof.

Since the description of the conductive material, the binder, and the solvent is the same as described in the part for the above-described anode, it will be omitted.

The separator is not particularly limited as long as it is used as a separator in the art, and a porous separator is preferable. Non-limiting examples of the separator may include a porous polymer film made of a polyolefin-based polymer such as ethylene homopolymer, propylene homopolymer, ethylene/butene copolymer, ethylene/hexene copolymer and ethylene/methacrylate copolymer; a porous nonwoven fabric made of high melting point glass fiber, polyethylene terephthalate fiber, and the like, which may be used alone or by laminating two or more types thereof. In addition, an insulating thin film having ion permeability and mechanical strength may be used.

The electrolyte may include a non-aqueous solvent and an electrolyte salt, and may optionally further include an additive such as an overcharge inhibitor.

The non-aqueous solvent is not particularly limited as long as it is commonly used as a non-aqueous solvent for the non-aqueous electrolyte, and cyclic carbonates, linear carbonates, lactones, ethers, esters, ketones or the like may be used.

Examples of the cyclic carbonate may include ethylene carbonate (EC), propylene carbonate (PC), butylene carbonate (BE), fluoroethylene carbonate (FEC), and the like, and examples of the linear carbonate may include diethyl carbonate (DEC), dimethyl carbonate (DMC), dipropyl carbonate (DPC), ethylmethyl carbonate (EMC) and methylpropyl carbonate (MPC). Examples of the lactone may include gamma butyrolactone (GBL), and examples of the ether may include dibutyl ether, tetrahydrofuran, 2-methyltetrahydrofuran, 1,4-dioxane, 1,2-dimethoxyethane, and the like. In addition, examples of the ester may include n-methyl acetate, n-ethyl acetate, methyl propionate, methyl pivalate, and the like, and the ketone may include polymethylvinyl ketone. These non-aqueous solvents may be used individually or in combination of 2 or more types thereof.

The electrolyte salt is not particularly limited as long as it is commonly used as an electrolyte salt for a non-aqueous electrolyte. A non-limiting example of the electrolyte salt may be a salt having a structure such as $A^+B^-$, where $A^+$ includes an ion composed of an alkali metal cation such as $Li^+$, $Na^+$, $K^+$, or a combination thereof, and $B^-$ includes an ion composed of an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_2^-$, or a combination thereof. These electrolyte salts may be used individually or in combination of two or more types thereof. In an example, the electrolyte salt may be a lithium salt or a sodium salt.

The above-described secondary battery may be manufactured by disposing the separator between the cathode and the anode to form an electrode assembly, placing the electrode assembly in a pouch, a cylindrical battery case, or a prismatic battery case, and then injecting an electrolyte. Alternatively, it may be manufactured by stacking the electrode assembly, impregnating it in an electrolyte, and sealing the resultant product in a battery case.

Such a secondary battery may be used not only in a battery cell used as a power source for a small device, but may also be used as a unit cell in a medium or large battery module including a plurality of battery cells. Examples of the mid-to-large device may include electric vehicles, hybrid electric vehicles, plug-in hybrid electric vehicles, and power storage systems, and, in particular, it may be usefully applicable to hybrid electric vehicles and renewable energy storage batteries in the field requiring high output.

Hereinafter, the present invention will be described in more detail through Embodiments and Comparative Examples. However, the following embodiments are provided to merely illustrate the present invention, and the scope of the present invention is not limited thereto.

Embodiment 1

1-1. Preparation of Secondary Polymer Particles

Polyacrylonitrile (PAN) as a carbonization precursor polymer and styrene-co-acrylonitrile (SAN) (styrene repeating unit:acrylonitrile repeating unit=7:3) as a sacrificial polymer were mixed in a weight ratio in a range from 1:4 (PAN:SAN), and the mixture was dissolved in N,N-dimethylformamide (DMF), which is a common solvent thereof, thereby obtaining a first solution. Then, DMF was evaporated from the first solution to obtain a bullion (e.g., mass) of aggregate. Then, 1 g of the aggregate was added to 20 g of acetone, which is a solvent capable of dissolving only SAN, and the SAN in the aggregate was dissolved to obtain a second solution. The obtained second solution was a solution containing secondary PAN particles including only remaining PAN, which is obtained by removing SAN from the aggregate. Then, secondary PAN particles were separated from the second solution through 5 times of centrifugation, and then the separated PAN particles were dried at 100° C. for 24 hours to remove acetone from the secondary PAN particles.

FIG. 1 is a SEM image illustrating the secondary PAN particles prepared above in which the secondary PAN particles have a particle diameter in a range from about 3 to 5.1 µm [see FIG. 1A], are in the form of spherical particles [see FIG. 1(b)], are formed by flocculation and aggregation of the primary particles in a range from about 46 to 53 nm, and have a porous structure (see FIG. 1C).

1-2. Preparation of Anode Active Material

After raising a temperature to 280° C. at a temperature increase rate of 10° C./min, the secondary PAN particles obtained in Embodiment 1-1 were stabilized for 1 hour in an air atmosphere, and then the temperature was raised to about 1000° C. at a temperature increase rate of 5° C./min to carbonize the stabilized secondary PAN particles in an $N_2$ atmosphere, thereby preparing an anode active material including the secondary carbon particles.

Figure 2:
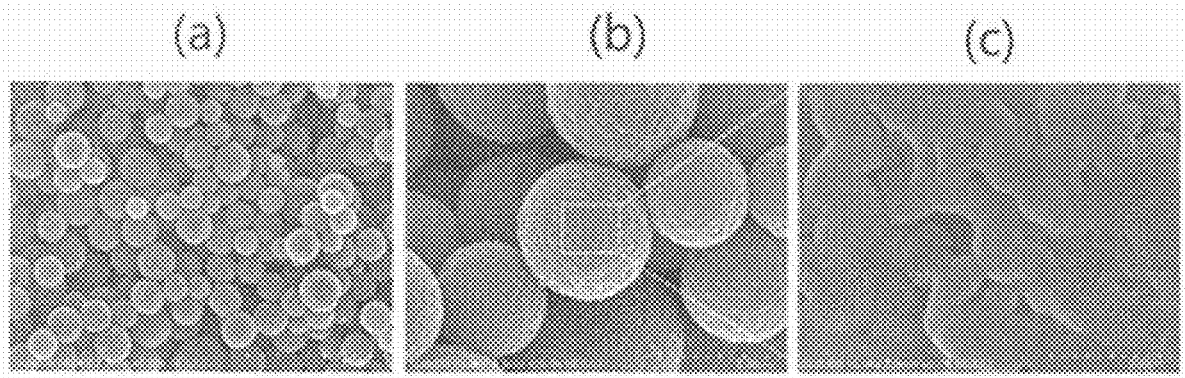
FIG. 2 is a SEM image illustrating an anode active material including secondary carbon particles prepared in Embodiment 1-2.

FIG. 2 is a SEM image illustrating the secondary carbon particles, and it was appreciated that the secondary carbon particles are spherical particles (see FIGS. 2A and 2B), are formed by flocculation and aggregation of a plurality of primary carbon particles, and are porous particles (see FIG. 2C).

Embodiment 2

Secondary PAN particles and an anode active material were prepared in the same manner as in Embodiment 1, except that PAN and SAN were mixed in a weight ratio of 1:9 (PAN:SAN).

Embodiment 3

Secondary PAN particles and an anode active material were prepared in the same manner as in Embodiment 1, except that PAN and SAN were mixed in a weight ratio of 3:7 (PAN:SAN).

Experimental Example 1

Figure 3A:
FIG. 3A is a SEM image illustrating secondary PAN particles prepared in Embodiment 2.
Figure 3B:
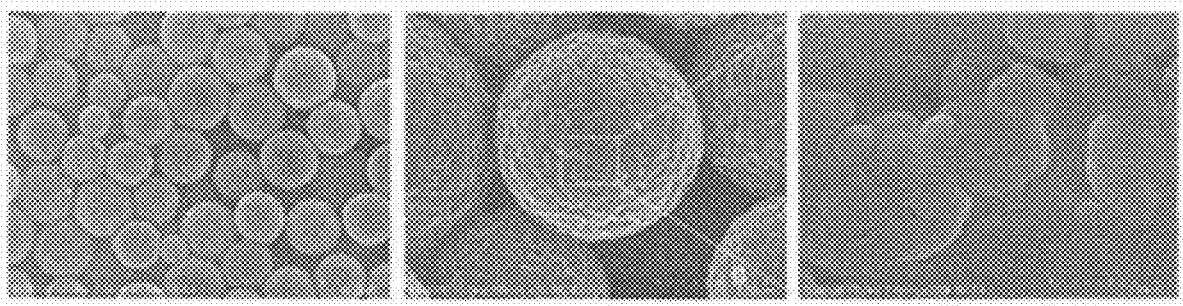
FIG. 3B is a SEM image illustrating secondary PAN particles prepared in Embodiment 1.
Figure 3C:
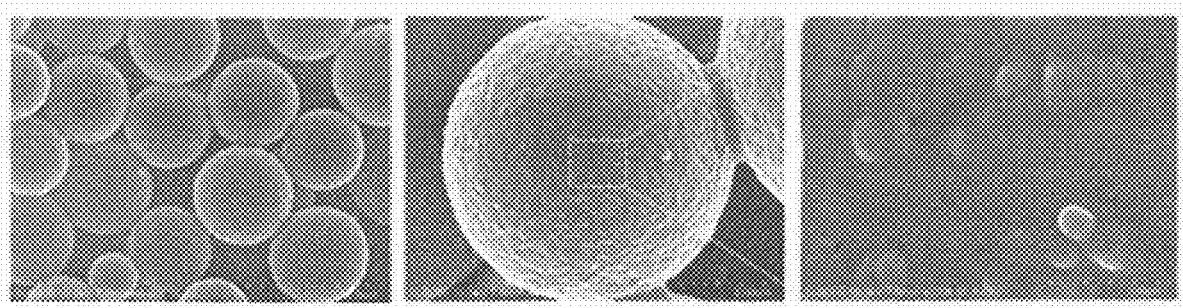
FIG. 3C is a SEM image illustrating secondary PAN particles prepared in Embodiment 3.

In preparing of the anode active material according to the present invention, in order to check a shape and a size change of the secondary particles of the carbonization precursor polymer according to a mixing ratio of the carbonization precursor polymer and the sacrificial polymer, the secondary PAN particles prepared in Embodiments 2, 1 and 3 were checked by SEM, and the results are illustrated in FIGS. 3A to 3C, respectively.

As illustrated in FIG. 3, as a ratio of the content of SAN with respect to the content of PAN decreases [FIG. 3A (Embodiment 2)→FIG. 3B (Embodiment 1)→FIG. 3C (Embodiment 3)], a particle size of the secondary PAN particles increased, but a porosity decreased. On the other hand, as the ratio of the content of SAN with respect to the content of PAN increases ([FIG. 3C (Embodiment 3)→FIG. 3B (Embodiment 1)→FIG. 3A (Embodiment 2)], the particle size of the secondary PAN particles decreased, but a yield was lowered.

Experimental Example 2

Figure 4:
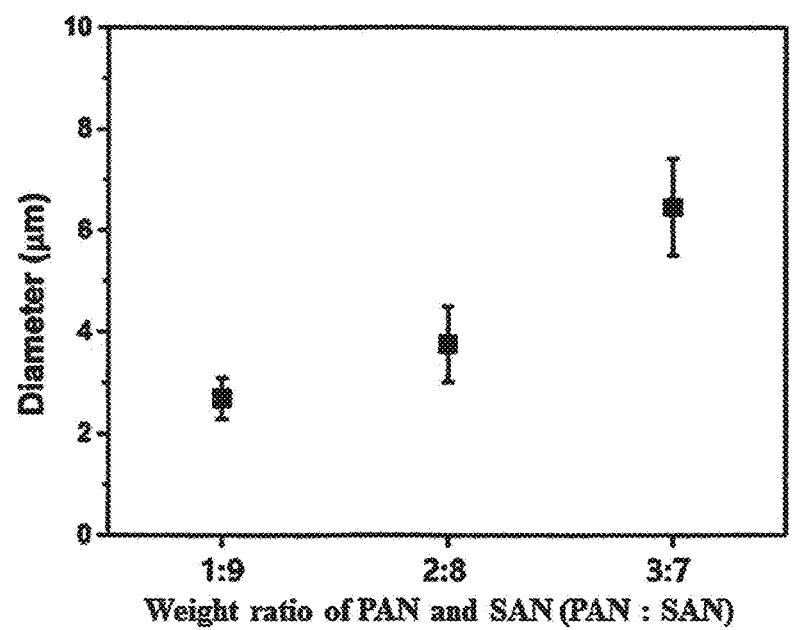
FIG. 4 is a graph showing an average particle size distribution of secondary carbon particles according to a PAN/SAN (Polyacrylonitrile/Styrene-co-acrylonitrile) ratio.

In preparing of the anode active material according to the present invention, in order to check an average particle diameter of the secondary carbon particles according to the mixing ratio of the carbonization precursor polymer and the sacrificial polymer, the particle diameter of the secondary carbon particles prepared in Embodiments 1 to 3 was measured, respectively, and the results are illustrated in FIG. 4.

As illustrated in FIG. 4, the average particle diameter of the secondary carbon particles was distributed in a range from about 2 to 8 µm according to the weight ratio of PAN to SAN (PAN:SAN). In particular, when a content ratio of PAN was lowered to 20 wt % or less, secondary carbon particles having an average particle diameter in a range from about 2 to 5 µm were easily prepared.

Embodiment 4

Secondary PAN particles and secondary carbon particles were prepared in the same manner as in Embodiment 1, except that, together with PAN and SAN, tin acetate (II) was additionally dissolved in DMF to obtain the first solution. In such an embodiment, tin acetate (II) was added so that an element ratio of carbon (C) of PAN and Sn (C:Sn) was 5:1.

Figure 5A:
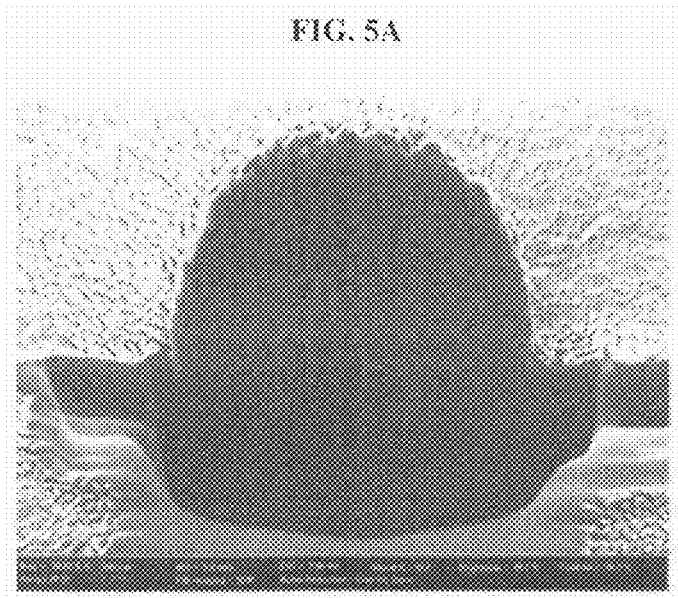
FIG. 5A is a FIB (Focused Ion Beam) image illustrating a cross-section of secondary carbon particles prepared in Embodiment 4.
Figure 5B:
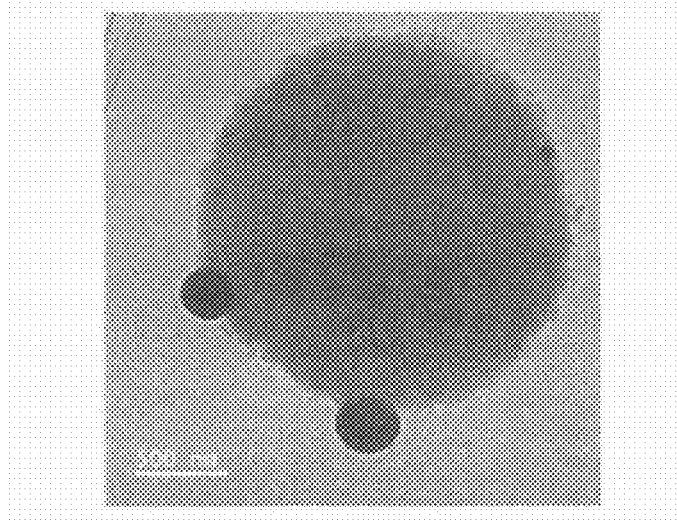
FIG. 5B is a TEM (Transmission Electron Microscope) image illustrating secondary carbon particles prepared in Embodiment 4.

FIG. 5A is a FIB (Focused Ion Beam) image illustrating a cross-section of the secondary carbon particles, FIG. 5B is a TEM (Transmission Electron Microscope) image illustrating the secondary carbon particles.

Experimental Example 3

Figure 6:
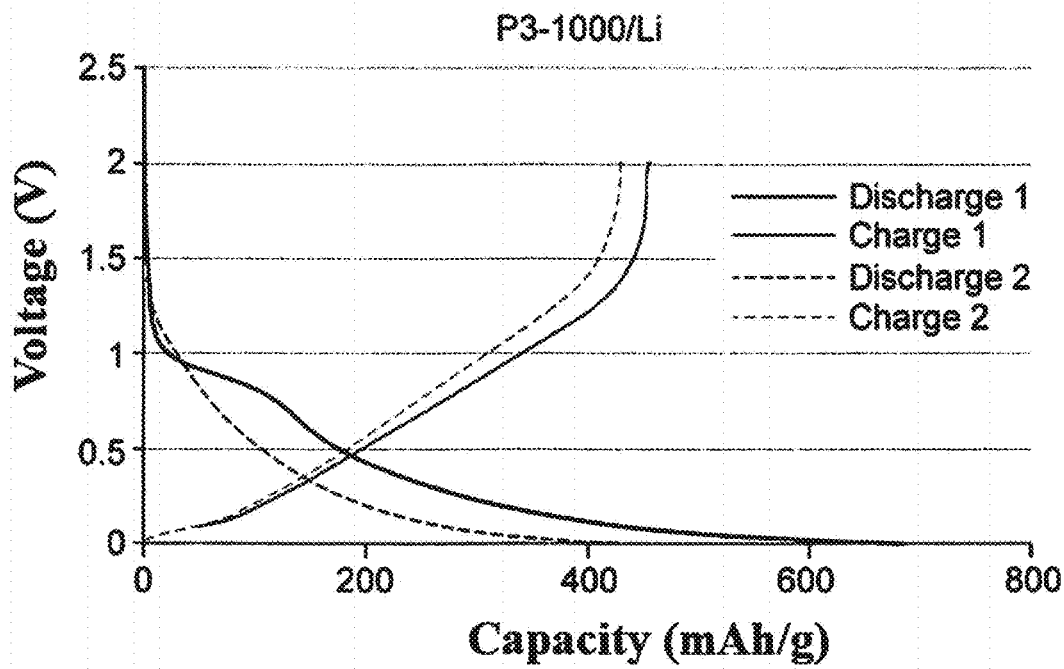
FIG. 6 is an initial charge/discharge curve of a lithium ion half-cell prepared in Experimental Example 3.

The anode active material prepared in Embodiment 1 was mixed with super P as a conductive material and polyvinylidene fluoride (PVdF) as a binder in a weight ratio of 80:10:10 (secondary carbon particles:conductive material:binder) to manufacture an anode. Then, after a lithium ion half-cell was manufactured using the prepared anode, an initial charge/discharge capacity was measured between 0.005 to 2 V at a rate controlling of 20 mA/g. The measurement results are illustrated in FIG. 6. In such a case, the composition of the electrolyte was 1.2M $LiPF_6$ in EC/EMC.

As a result of the measurement, the initial discharge capacity of the lithium ion half-cell battery was about 687 mAh/g, the initial charge capacity was about 454 mAh/g, and the initial efficiency was 66%. This was about 22% higher reversible capacity compared to the graphite anode material with a theoretical capacity of about 372 mAh/g.

Experimental Example 4

Figure 7:
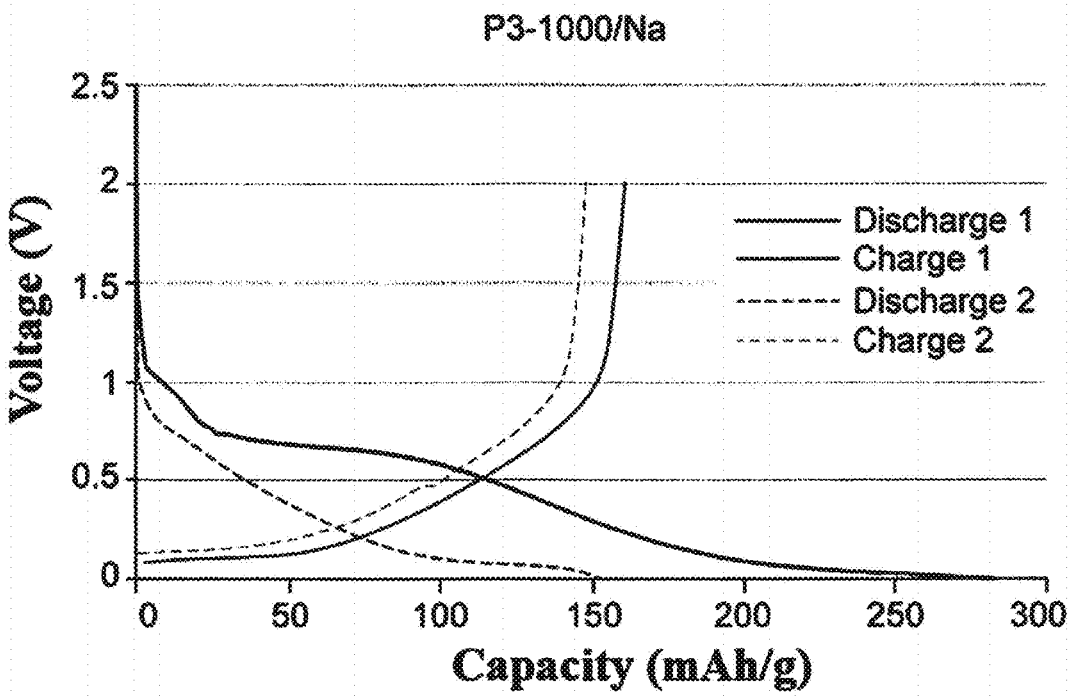
FIG. 7 is an initial charge/discharge curve of a sodium ion half-cell prepared in Experimental Example 4.

The anode active material prepared in Embodiment 1 was mixed with super P as a conductive material and polyvinylidene fluoride (PVdF) as a binder in a weight ratio of 80:10:10 (secondary carbon particles:conductive material: binder) to manufacture an anode. Then, after manufacturing a sodium ion half-cell using the prepared anode, an initial charge/discharge capacity was measured between 0.005 to 2 V at a rate of 20 mA/g. The measurement results are illustrated in FIG. 7. In such a case, the composition of the electrolyte was 1M NaPF$_6$ in PC+2% FMC.

As may be appreciated from FIG. 7, the sodium ion half-cell had an initial discharge capacity of about 283 mAh/g, an initial charge capacity of about 160 mAh/g, and an initial efficiency of about 56%.

Although the present invention has been illustrated and described in connection with exemplary embodiments for illustrating the principles of the present disclosure, the present invention is not limited to the configuration and operation as illustrated and described as such. Rather, it will be apparent to those skilled in the art that many changes and modifications may be made to the present invention without departing from the spirit and scope of the appended claims.

What is claimed is:

1. An anode active material comprising:
secondary carbon particles formed by flocculation of a plurality of primary carbon particles having an average particle diameter ($D_{50}$) in a range from 5 to 200 nm; and
graphite,
wherein the secondary carbon particles have an average particle diameter ($D_{50}$) in a range from 0.5 to 20 μm,
wherein a ratio (D2/D1) of a particle diameter (D2) of the graphite to a particle diameter (D1) of the secondary carbon particle is in a range from 2 to 8, and
the secondary carbon particles and graphite are included in a ratio in a range from 5:95 to 90:10 by weight.

2. The anode active material of claim 1, wherein the secondary carbon particles have a spherical porous structure.

3. The anode active material of claim 2, wherein the secondary carbon particles have a specific surface area in a range from 0.5 to 100 m$^2$/g.

4. The anode active material of claim 1, wherein the secondary carbon particles have a particle size distribution that satisfies the following Relational Expression 1:

$$\leq (D_{90}-D_{10})/D_{50} \leq 0.7 \quad \text{[Relational Expression 1]}$$

in the above Relational Expression 1,
$D_{90}$, $D_{10}$ and $D_{50}$ are particle sizes having a cumulative volume of 90% by volume, a particle size having a cumulative volume of 10% by volume, and a particle size having a cumulative volume of 50% by volume, respectively, in a volume-based particle size distribution by a laser diffraction particle size distribution measuring method.

5. The anode active material of claim 1, further comprising graphite.

6. An anode comprising the anode active material of claim 1, wherein the anode active material comprises:
secondary carbon particles formed by flocculation of a plurality of primary carbon particles having an average particle diameter ($D_{50}$) in a range from 5 to 200 nm; and
graphite,
wherein the secondary carbon particles have an average particle diameter ($D_{50}$) in a range from 0.5 to 20 μm,
wherein a ratio (D2/D1) of a particle diameter (D2) of the graphite to a particle diameter (D1) of the secondary carbon particle is in a range from 2 to 8, and
the secondary carbon particles and graphite are included in a ratio in a range from 5:95 to 90:10 by weight.

7. A method of manufacturing the anode active material of claim 1, the method comprising:
(S100) forming a first solution by dissolving a carbonization precursor polymer and a sacrificial polymer in a first solvent which is a common solvent;
(S200) forming a first aggregate by removing the first solvent from the first solution; and
(S300) carbonizing the first aggregate, or carbonizing a second aggregate formed by removing the sacrificial polymer from the first aggregate.

8. The method of claim 7, wherein the second aggregate is formed by:
forming a second solution including the second aggregate by dissolving the sacrificial polymer in the first aggregate with a second solvent for dissolving the sacrificial polymer; and
separating the second aggregate from the second solution.

9. The method of claim 7, wherein the carbonization precursor polymer and the sacrificial polymer are used in a ratio in a range from 1:2 to 9 by weight.

10. The method of claim 7, wherein the carbonization precursor polymer comprises one or more of: polyacrylonitrile (PAN), polyvinyl pyrrolidine (PVP), polyimide, polyvinyl alcohol (PVA), polyvinyl chloride (PVC), pitch, lignin and cellulose.

11. The method of claim 7, wherein the sacrificial polymer comprises one or more of: styrene-co-acrylonitrile (SAN), polylactic acid (PLA), poly(lactic-co-glycolic acid) (PLGA), polymethacrylate (PMMA), and poly(vinylidene fluoride) (PVDF).

12. The method of claim 7, further comprising a metal precursor including one or more metal M of a group 13 element, a group 14 element and a transition metal in the first solvent.

13. The method of claim 12, wherein the metal precursor is added so that an element ratio of C:M is in a range from 10 to 1:1 with respect to carbon (C) in the carbonization precursor polymer.

14. The method of claim 8, wherein a ratio (W2/W1) of a content (W2) of the second solvent to a content (W1) of the sacrificial polymer is in a range from 18 to 22.

15. The method of claim 8, wherein the first aggregate and the second solvent are used in a ratio in a range from 1:14 to 18 by weight.

16. The method of claim 7, wherein in the carbonizing, the first aggregate or the second aggregate is heat-treated after raising a temperature to a range from 600 to 1600° C. in an inert gas atmosphere.

17. The method of claim 16, wherein the carbonizing is performed after raising a temperature to a range from 200 to 300° C. and then stabilizing the first aggregate or the second aggregate in an oxygen-containing atmosphere by heat-treating.

* * * * *